April 29, 1930.  A. V. SAHAROFF  1,756,137
UNLOADING APPARATUS FOR VARIABLE VOLUME COMPRESSORS
Filed Nov. 22, 1923  4 Sheets-Sheet 1

A. V. SAHAROFF.
INVENTOR
BY
ATTORNEY

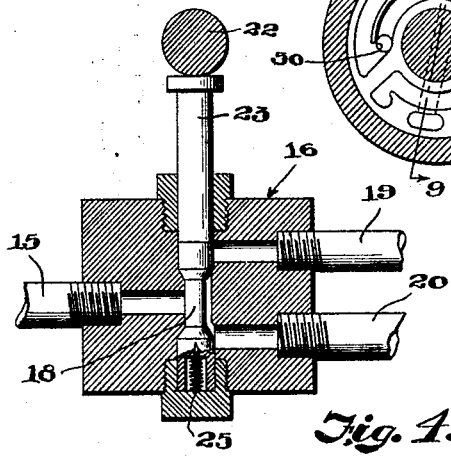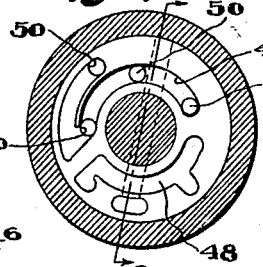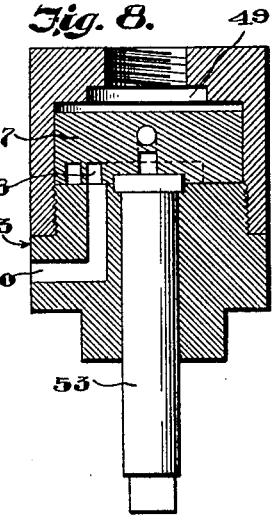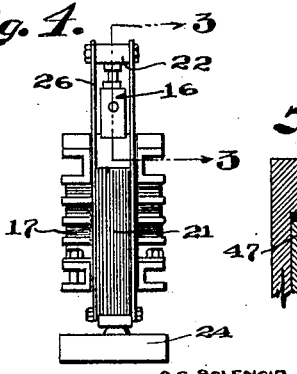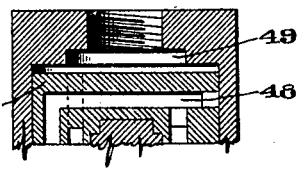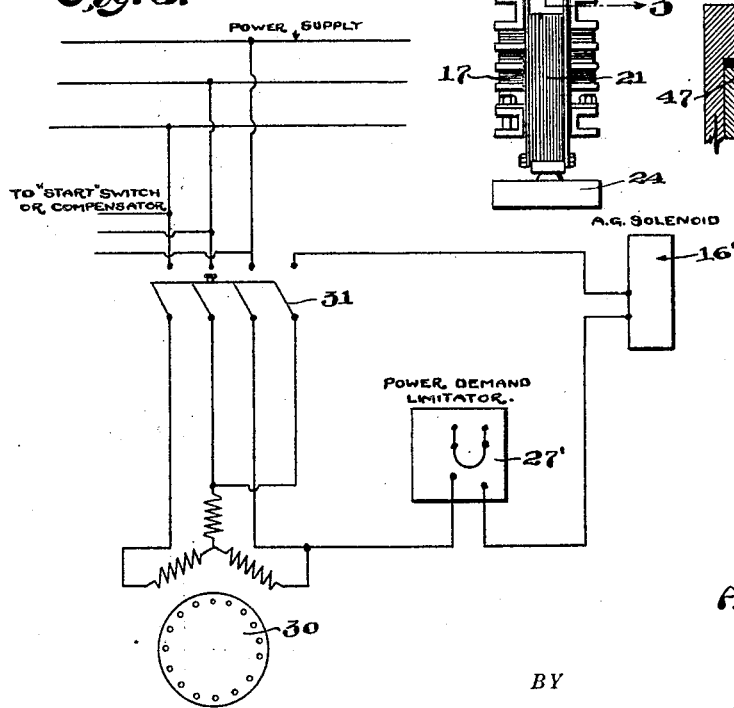

A. V. SAHAROFF.
INVENTOR

BY

ATTORNEY

Patented Apr. 29, 1930

1,756,137

UNITED STATES PATENT OFFICE

ALEXANDER V. SAHAROFF, OF CINCINNATI, OHIO, ASSIGNOR TO WORTHINGTON PUMP AND MACHINERY CORPORATION, OF NEW YORK, N. Y., A CORPORATION OF VIRGINIA

UNLOADING APPARATUS FOR VARIABLE-VOLUME COMPRESSORS

Application filed November 22, 1928. Serial No. 321,109.

This invention relates to variable capacity air or gas compressors of the type embodying a series of control valves, each acting to control a partial unloading of the compressor cylinder or cylinders, so as to vary the cylinder capacity in accordance with the number of control valves operated, and the regular operation of these control valves is secured by a regulator or governor acting through a distributor valve to vary the relative pressures tending to move the control valves in opposite directions for unloading or loading the compressor.

The primary object of the present invention is to provide means for completely unloading the compressor in emergencies or at predetermined times, such as on loss of oil pressure, failure of circulating water, excessive temperatures in the compressor structure, in response to the action of a power demand limitator, etc., and in instances where the unloading means is employed in connection with electric motor driven compressors, to break the circuit through the motor and stop operation of the compressor.

More specifically the present invention embodies means whereby the compressor is unloaded by the closing of the exhaust line from the regulator or governor controlling operation of the control valves and introducing, at the same time, fluid under pressure into the exhaust of the regulator distributing valve for operating the control valves to completely unload the compressor. If the governor or regulator, at the time this action takes place, is in a position so as to maintain the compressor in a full loaded condition, then the pressure fluid admitted by said means, passes in a reverse direction through the distributor valve to the various compressor control valves and operates all of them. If the regulator is in position so as to unload the compressor partially, then pressure fluid is admitted through the distributor valve to the control valves of the compressor not already held in compressor unloading position and moves them into unloading position.

In other words, the present invention embodies means by which, regardless of the type of regulator and distributor valve employed in connection with the unloading mechanism of variable capacity compressors, the compressor may be thrown into its completely unloaded condition by admitting pressure fluid through the exhaust of the distributing valve.

With these objects in view, the invention consists in various features of construction and combination of parts, which will be first described in connection with the accompanying drawings, showing a compressor of the preferred form embodying the invention, and the features forming the invention will be specifically pointed out in the claims.

In the drawings,

Fig. 3 is a detailed section, taken on the line 3—3 of Fig. 4, through a solenoid operated valve which controls the admission of pressure fluid in the exhaust line of the regulator.

Fig. 4 is a side elevation partly in section of the complete solenoid operated valve structure.

Fig. 5 is a diagrammatic view showing the invention associated with a power demand limitator and used in connection with an induction motor driven compressor.

Fig. 7 is a horizontal section through the distributor valve illustrated in Fig. 6.

Fig. 8 is a vertical section through the distributor valve, taken on the line 8—8 of Fig. 7.

Fig. 9 is a detailed vertical section through the distributor valve, taken on the line 9—9 of Fig. 7.

Figure 1:
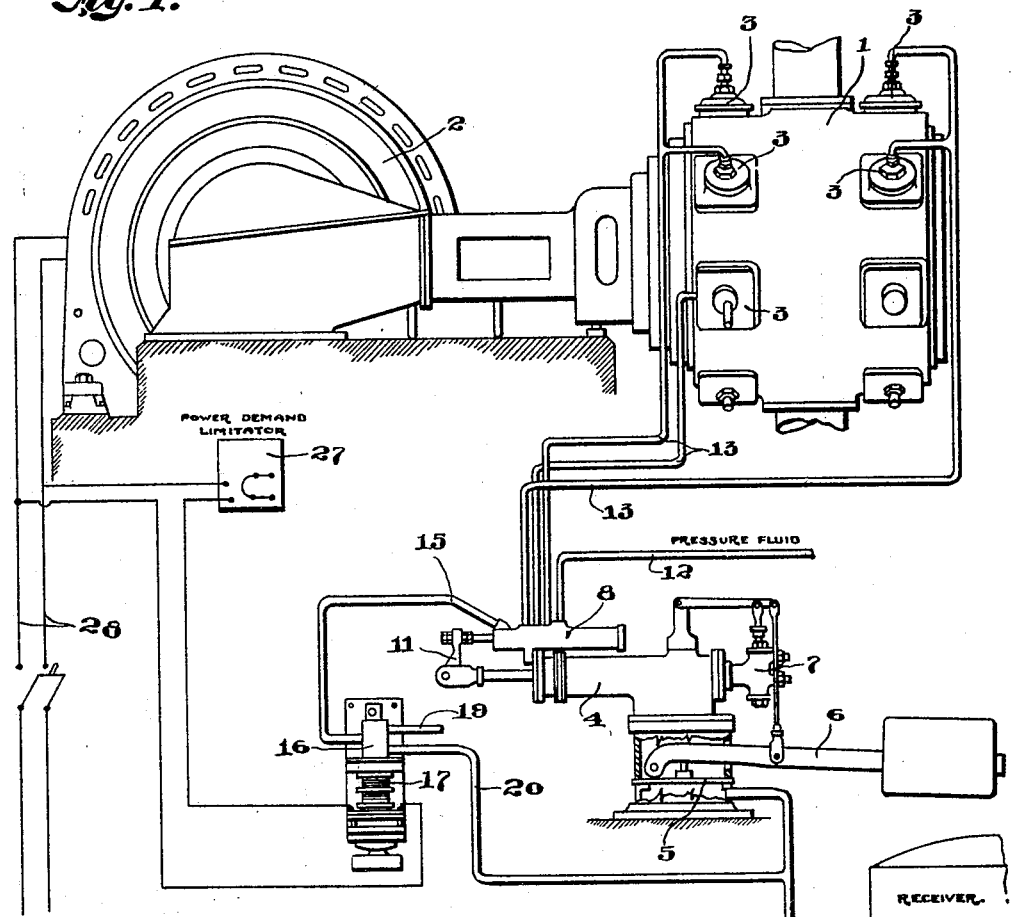
Fig. 1 is a diagrammatic view showing the invention applied to a motor driven air or gas compressor and to operate in conjunction with a power demand limitator.

Referring to the drawings, and more particularly to the system illustrated in Figs. 1 to 4 inclusive; the compressor 1 is driven by an electric motor 2 and it has the clearance control valves 3 associated therewith, by means of which the capacity of the cylinder of the compressor is regulated in accordance with the demand. The control valves 3 may be of any approved construction and operate in any desired sequence for variable unloading of the compressor in any of a number of approved manners, one of which is disclosed in Patent No. 1,579,781, and another in Patent No. 1,636,439, it being understood that the present invention does not relate to any particular type of control valve or mechanism or system for unloading of the compressor cylinder.

In the system illustrated in Fig. 1 of the drawings, the control valves 3 are operated by a regulator structure 4 embodying a diaphragm 5 acted upon by receiver pressure fluid for operating the lever 6, which in turn, through the pilot valve 7, controls operation of the regulator 4 for operating the distributor valve 8. The distributor valve 8 includes the cylinder 9 in which the valve piston 10 reciprocates, the said piston being reciprocated by the regulator 4 through the connection 11. Fluid under pressure from any suitable source is admitted to the cylinder 9 through the pipe 12 and the movement of the piston 10 and the distributor valve construction controls the passage of the pressure fluid from the cylinder 9 to the various control valves 3 through the pipes 13 for operating the control valves to unload the compressor 1 in predetermined fractions of its maximum capacity. When the pressure of the pressure fluid admitted to the cylinder 9 through the pipe 12 decreases beyond various predetermined degrees, the various control valves 3, responsive to different degrees of pressure depending upon the fraction of the maximum capacity of the compressor, which they control, act to permit loading of the compressor to the capacity controlled by the respective valve or valves. At such times the pressure fluid in the valves exhausts through the pipes 13, cylinder 9 and the exhaust outlet or pipe 14 of the distributor valve, because at such times, the valve piston 10 is positioned, by operation of the regulator 4, to bring the pipes 13, which distribute the pressure fluid to the control valves, which are in a compressor loading position, into communication with the outlet or exhaust port 14.

The exhaust port 14 of the distributor valve 8 is connected by a pipe 15 with the solenoid operated valve 16, and when the solenoid 17 is energized the piston 18 of the valve 16 is in its upper position, establishing communication between the pipe 15 and the pipe 19 which exhausts to the atmosphere, or in instances of gas compressors may exhaust to the suction of the compressor.

When the circuit is broken through the solenoid 17, the piston 18 of the solenoid operated valve 16 is in its lower position, as shown in Fig. 3 of the drawings, and communication is established between the pipe 20 and the pipe 15. The pipe 20 is connected to any suitable supply source of pressure fluid so that when communication between the pipes 20 and 15 is open fluid under pressure will be admitted through the exhaust port 14 of the distributor valve 8 and through all of the pipes 13 which are, at such time, in communication with the exhaust port to the respective control valves 3 for operating these control valves to completely unload the compressor 1.

Figure 2:
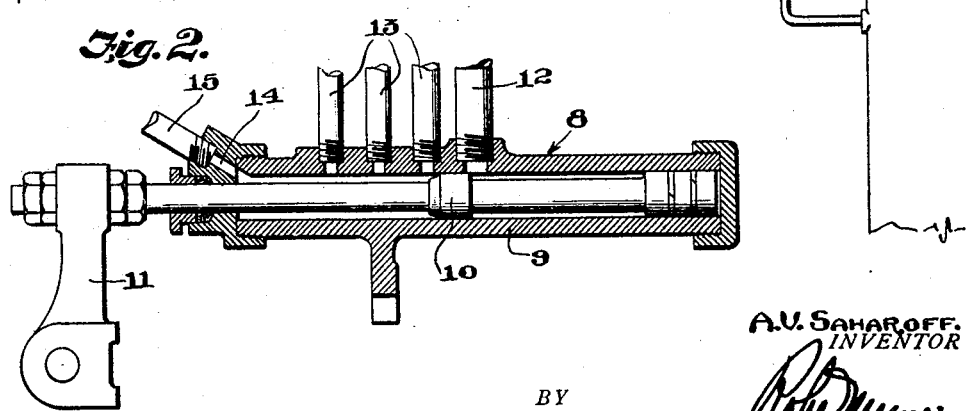
Fig. 2 is a longitudinal section through the distributor valve, used in connection with the form of regulator illustrated in Fig. 1.

In Fig. 2 of the drawings the distributor valve 8 is shown with its piston 10 positioned so that all of the control valves 3 will be in compressor loading position and therefore all of them will be moved into compressor unloading position by the admission of pressure fluid into the cylinder 8 through the exhaust port 14. However, should any of the control valves 3 be in compressor unloading position at the time of the admission of pressure fluid through the exhaust port 14, they will remain in compressor unloading position, while others will be moved into compressor unloading positions.

In Fig. 4 of the drawings, the complete solenoid valve construction is illustrated and the core 21 of the solenoid is moved upward while the solenoid 17 is energized, and at such time the pressure rod 22 and pressure pin 23, which operate the piston 18, are relieved from the weight of the core 21 and the weight 24, so that the valve piston 18 is moved upward by the spring 25. When the solenoid 17 is de-energized, the weight 24 and the weight of the core 21 move the core downwardly and consequently the pressure rod 22 downwardly since this rod is connected to the core 21 by the straps 26 and move the piston 18 downwardly against the spring 25.

In the diagrammatic Fig. 1, the solenoid 17 is shown connected in circuit with a power demand limitator 27, which is in turn connected in the power line 28 which supplies the current to the motor 2. The power demand limitator 27 may be of any approved construction, such as may be purchased upon the open market, and this limitator is an electric device for automatically controlling and limiting "power demand" or peak loads on the electric power system and it may be adjusted so that any desired load may be controlled for any amount of energy.

When the predetermined demand has been reached, the limitator will reduce the power supply to the motor 2 and thus limit the peak. When the limitator 27 operates to limit power demand of the motor 2, it breaks the circuit through the solenoid 17, which permits the admission of pressure fluid through the exhaust port 14 into the distributor valve 8 and completely unloads the compressor 1, regardless of the loaded or unloaded state of the compressor as controlled by the regulator 4.

In Fig. 5 of the drawings, a wiring diagram is illustrated, showing the solenoid control valve structure 16' connected in circuit with a power demand limitator 27' and with a squirrel cage induction motor 30. The solenoid valve structure 16' is in circuit with the motor 30, through the limitator 27' and through the "run" switch 31, which may be opened by any protective relay, so that when the switch 31 is opened and power is cut off to the motor 30, the solenoid valve structure 16' will be de-energized for permitting complete unloading of the compressor in the manner described in connection with Figs. 1 to 4 of the drawings.

Figure 6:
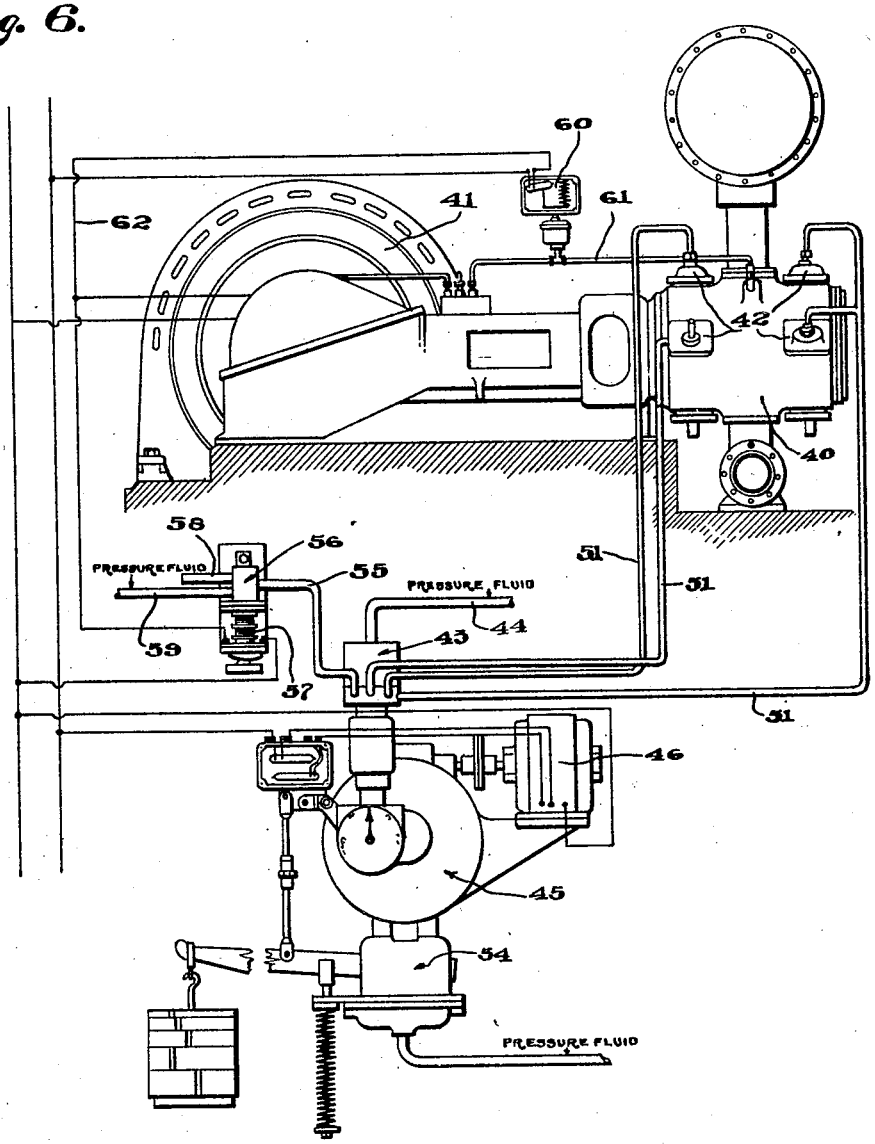
Fig. 6 is a diagrammatic view illustrating the application of the invention to a motor driven compressor, utilizing an electrically operated regulator for regulating the unloading of the compressor, and showing the emergency unloading structure operable in connection with means sensitive to pressure of lubricating oil.

Referring to the diagrammatic arrangement illustrated in Fig. 6 of the drawings, the compressor 40, which is of any approved construction, is operated by the electric motor 41 and it has control valves 42, which operate to control fractional loading or unloading of the compressor in the same manner in which the control valves 3 operate to control the loading and unloading of the compressor 1. The pressure fluid for operating the control valves 42 is distributed thereto, from a suitable supply source, by the distributor valve 43, which receives the pressure fluid through the pipe 44. The distributor valve 43 and the governor or regulator mechanism 45, which controls operation of the valve 43, are specifically described in my companion application, Serial No. 314,434, filed October 23rd, 1928 and will not be specifically described in the present application. The regulator structure 45 is electrically operated through the medium of the motor 46 for operating the distributor valve 43, which is shown in detail in Figs. 7 to 9 inclusive of the drawings. The distributor valve 43 includes the rotary disc 47 which is provided with a plurality of passageways 48, which establish communication between the pressure fluid inlet chamber 49 in the valve structure 43 and the various passageways and ports 50, which have communication through the pipes 51 with the control valves 42 for supplying the pressure fluid to the control valves. The passageways 48 also establish communication with the exhaust port 52 of the valve structure 43. The disc 47, which controls communication of the various ports or passageways 50, with the inlet chamber 49 or exhaust 52, is rotated through the medium of the shaft 53, rotation of which is in turn controlled by a pressure responsive mechanism generically indicated at 54, and when the control valves 42 are in compressor unloading position, they are subjected to pressure fluid by the establishing of communication between the pipes 51 and the inlet chamber 49 and they are cut off from communication with the exhaust port 52. However, when the control valves 42 are in compressor loading position, the pipes 51 have communication with the exhaust port 52 through either of the passages 48 to permit exhausting of the pressure fluid from the control valve structures.

The exhaust port 52 of the valve 43 is connected by means of a pipe 55 with the valve 56, operation of which is controlled by the solenoid 57. The valve 56 is identical in construction with the valve 16, so that, when the solenoid 57 is energized, the valve is in position to permit fluid passing through the pipe 55 to exhaust from the valve 56 through the pipe 58, either to the atmosphere or to the suction of the compressor. However, when the solenoid 57 is de-energized, the valve 56 is operated to admit pressure fluid from a suitable source through the pipe 59, valve 56, and through the exhaust port 52 of the distributor valve 43 to any of the control valves 42, which are in compressor loading position so as to move them into compressor unloading position.

The solenoid 57, in the construction illustrated on Fig. 6 of the drawings, is connected in circuit with a pressure operated control switch 60, of any suitable construction, so as to be responsive to action of said switch 60. However, a "mercoid" pressure operated switch is illustrated in the drawings, and this "mercoid" pressure operated switch 60 is connected in the lubricating line 61 of the compressor structure so that the valve 60 will be responsive to pressure of the lubricant in the force feed lubricating system of the compressor. When the proper circulation of the lubricating oil in the compressor fails, the "mercoid" switch 60 will operate to break the circuit through the solenoid 57, to provide complete unloading of the compressor as above specified, and owing to the fact that the switch 60 is also placed in the energizing line of the motor 41, the motor will also be de-energized, and the compressor will cease operation as well as being completely unloaded upon the failure of proper lubrication. The switch 60 is connected in the circuit for controlling energizing of the motor 41 and the solenoid 55 by suitable wires 62, as clearly illustrated in Fig. 6 of the drawings.

Figure 10:
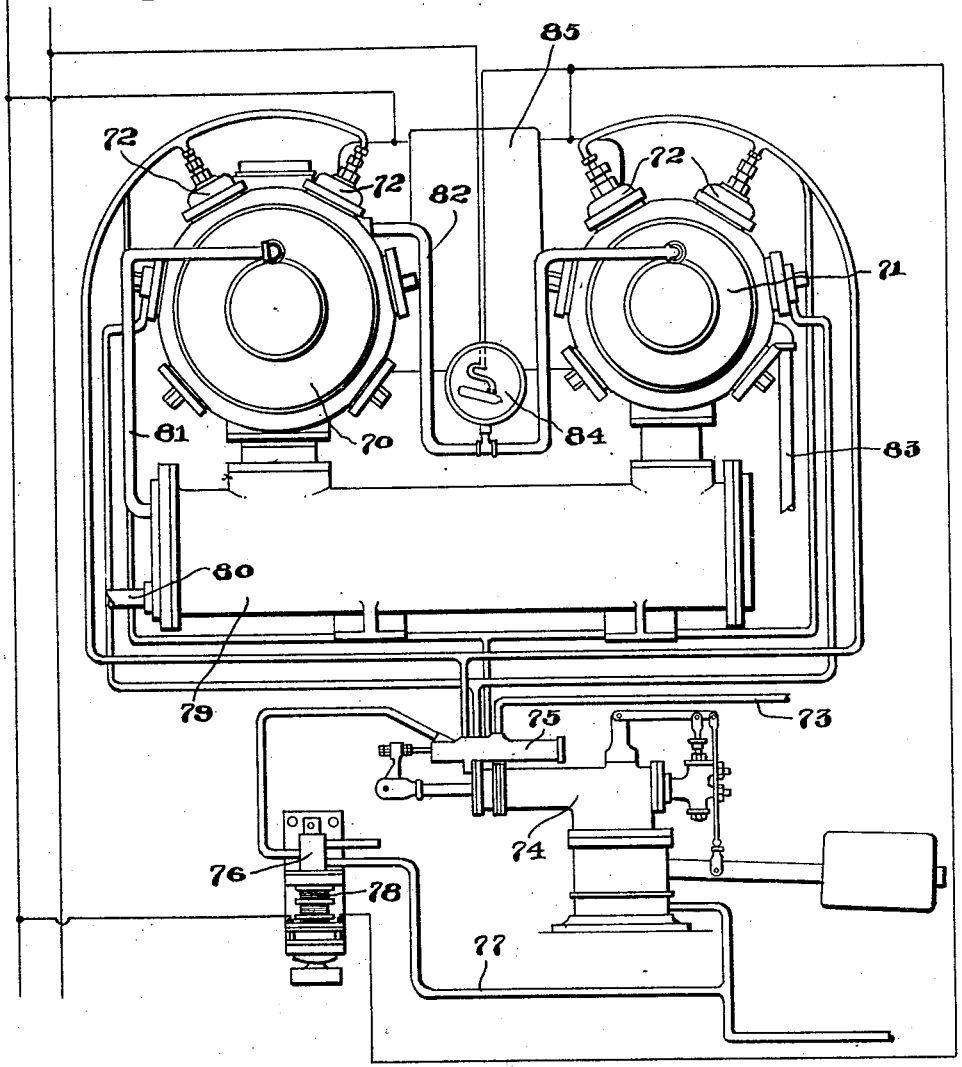
Fig. 10 is a diagrammatic view illustrating the emergency unloading mechanism operable in response to failure of cooling water.

In Fig. 10 of the drawings, the emergency unloading mechanism is illustrated as being responsive to cooling water failure, or failure of proper circulation of cooling water through the compressor.

In the construction shown in Fig. 10, the compressors 70 and 71 have control valves 72 associated therewith, which operate in the same manner as the control valves 3 and 42 for controlling loading and unloading of the compressors, and the delivery of pressure fluid to the control valves 72 from a suitable supply source, through the pipe 73, is controlled by a regulator 74, which is illustrated as of the same construction and type as the regulator 4, through the distributor valve 75. The distributor valve 75 is of the same type and construction and operated in the same manner as the distributor valve 8, so that its exhaust port is connected to the solenoid operated valve 76, which in turn has connection through a pipe 77 with a suitable supply source of pressure fluid so as to admit the pressure fluid backwards through the distributing valve 75 to the control valves 72 upon the de-energizing of the solenoid 78 in the same manner in which the pressure fluid is admitted to the control valves 3 through the exhaust port 14 of the distributor valve 8.

The water circulating system of the compressor structure is illustrated in Fig. 10 of the drawings, and the water enters the intercooler 79 through the inlet 80. The intercooler 79 is of the two-pass type, that is, the cooling water entering the intercooler passes through a part thereof in one direction and then returns through another part of the intercooler in a reverse direction, leaving the intercooler through the pipe 81 from which it enters the cooling jackets of the compressor 70. From the compressor 70 the cooling water passes through a suitable piping, as indicated at 82, into the cooling jackets of the compressor 71. After circulation through the cooling jackets of the compressor 71 the cooling water passes outwardly through a suitable outlet pipe 83.

A pressure responsive "mercoid" switch structure 84 is shown connected to the pipe 82 and it is responsive to the pressure of the cooling water as it is circulated through the cooling water system of the compressor unit. While the pressure responsive "mercoid" switch 84 is shown connected to the pipe 82, it is to be understood that it can be connected at any desired place in the water circulating system of the compressor. The pressure responsive "mercoid" switch 84 being connected in the energizing circuit of the solenoid 78 and of the motor 85, which operates the compressors 70 and 71, will control the energizing of the solenoid 78 and of the motor 85, so that, when the pressure of the circulating water is up to the requirements the switch 84 will be operated so as to permit energizing of both the motor 85 and the solenoid 78. However, should the water circulating system fail, at which time the pressure will naturally fail, the switch 84 will operate to break the circuit through both the motor 85 and the solenoid 78 so as to completely unload the compressors 70 and 71 and stop their operation through de-energizing of the motor 85.

Figure 11:
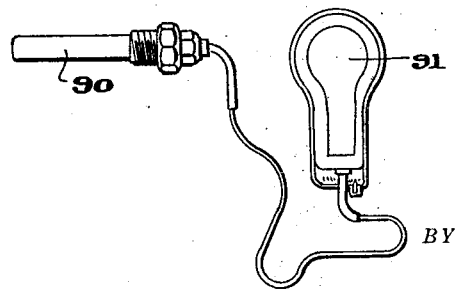
Fig. 11 is a view illustrating a temperature responsive device which may be used in connection with the emergency unloading means, for operating it under predetermined temperatures.

In Fig. 11 of the drawings, a temperature responsive "mercoid" switch structure of approved type, which may be purchased upon the open market, is illustrated, and this construction embodies the thermostat 90 and the switch structure 91 which is controlled by the thermostat 90 so as to render the switch 91 responsive to temperature variances. This type of temperature responsive switch mechanism, or any other approved analogous type of temperature responsive switch mechanism, may be substituted for the pressure responsive switch mechanism 84 or may be utilized at any suitable point in a compressor installation for controlling operation of the solenoid operated valve and of the motor for operating the compressor so as to provide for the unloading and stopping of the compressor when predetermined temperatures are reached.

Summing up, it will be apparent from the accompanying drawings and the foregoing description, that an emergency unloading mechanism for completely unloading a variable capacity compressor, irrespective of its loaded or unloaded regulator controlled condition, has been provided which operates, upon operation of a power demand limitator, failure of lubrication, failure of cooling water circulation, etc., to admit pressure fluid in a reverse direction through the regulator operated distributing valve to the control valves of the compressor.

While in all of the drawings an electric motor is illustrated as the motive means for operating the respective compressors, it is to be understood that the improved emergency unloading mechanism may be used in connection with compressors operated by any other type of motors, such as steam engines, internal combustion engines or the like, without departing from the spirit of this invention.

It will be understood that the invention is not to be limited to the specific construction or arrangement of parts shown but that these may be modified widely within the invention defined by the claims.

What is claimed is:

1. In a variable capacity compressor, the combination with a cylinder, pressure operated control valves controlling the loading and unloading of the cylinder, a distributor valve for controlling the passage of pressure fluid to said control valves, of means operated at predetermined times to admit control valve operating pressure fluid through said distributor valve in a reverse direction to the normal directional flow of fluid therethrough.

2. In a variable capacity compressor, the combination, of a cylinder, pressure operated control valves controlling the unloading and loading of the cylinder, a distributor valve, a regulator for operating said distributor valve to control passage of operating pressure fluid to said control valves, and means operated at predetermined times to admit pressure fluid through said distributor valve in a reverse direction to the normal directional flow of fluid therethrough to move said control valves into unloading position regardless of their regulator controlled position.

3. In a variable capacity compressor, the combination, of a cylinder, pressure operated control valves controlling the loading and unloading of the cylinder, a distributor valve for controlling the passage of operating pressure fluid to said control valves, and an emergency operated valve operated at predetermined times to admit control valve operating fluid through said distributor valve in a reverse direction to the normal directional flow of control valve operating fluid therethrough.

4. In a variable capacity compressor, the combination, of a cylinder, pressure operated control valves controlling the unloading and loading of the cylinder, a distributor valve, a regulator for operating said distributor valve to control passage of pressure fluid to said control valves, and a valve operated at predetermined times to admit control valve operating pressure fluid through said distributor valve in a reverse direction to the normal directional flow of control valve operating fluid therethrough to move said control valves into unloading position regardless of their regulator controlled positions.

5. In a variable capacity compressor, the combination with a cylinder, a motor for operating said compressor, pressure operated control valves controlling the unloading and loading of the cylinder, a distributor valve controlling the passage of operating pressure fluid to said control valves, of means operated at predetermined times to admit control valve operating pressure fluid through the distributor valve in a reverse direction to the normal directional flow of control valve operating fluid therethrough to move said control valves into unloading position, and means for arresting operation of said motor at the time of operation of said first named means.

6. In a variable capacity compressor, the combination, of a compressor cylinder, a motor for operating said compressor, pressure operated control valves controlling the loading and unloading of the cylinder, a distributor valve, a regulator for operating said distributor valve to control the passage of operating pressure fluid to said control valves, means operated at predetermined times to admit control valve operating pressure fluid through said distributor valve in a reverse direction to the normal directional flow of operating pressure fluid therethrough to move said control valves into compressor unloading position regardless of their regulator controlled positions, and means to arrest operation of said motor upon operation of said last named means.

7. In a variable capacity compressor, the combination, of a cylinder, pressure operated control valves for controlling the unloading and loading of the cylinder, a distributor valve, a regulator operating said distributor valve for controlling passage of operating pressure fluid to said control valves, the pressure fluid exhausting from said control valves through said distributor valves, and a valve in the exhaust from said distributor valve for closing the exhaust and admitting pressure fluid to said control valves through the exhaust of said distributor valve.

8. In a variable capacity compressor, the combination, of a motor for operating the compressor, a compressor cylinder, pressure operated control valves for controlling unloading and loading of the cylinder, a distributor valve, a regulator operating said distributor valve for controlling passage of operating pressure fluid to said control valves, the pressure fluid exhausting from said control valves through said distributor valve, a valve in the exhaust from said distributor valve for closing the exhaust and admitting pressure fluid to said control valves through the exhaust of said distributor valve, and means for arresting operation of said motor upon the closing of the exhaust of said distributor valve.

9. In a variable capacity compressor, the combination, of a cylinder, pressure operated control valves for controlling unloading and loading of the cylinder, a distributor valve, a regulator operating said distributor valve for controlling the passage of pressure fluid to said control valves, the pressure fluid exhausting from said control valves through said distributor valve, and a solenoid operated valve in the exhaust from said distributor valve for closing the exhaust and admitting operating pressure fluid to said control valves through the exhaust of said distributor valve.

10. In a variable capacity compressor, the combination, of an electric motor for operating the compressor, a compressor cylinder, pressure operated control valves for controlling unloading and loading of the cylinder, a distributor valve, a regulator operating said distributor valve for controlling passage of pressure fluid to said control valves, the pressure fluid exhausting from said control valves through said distributor valve, a solenoid operated valve in the exhaust from said distributor valve for closing the exhaust and admitting pressure fluid to said control valves through the exhaust of said distributor valve, and means for breaking the energizing circuit to said motor at operation of said solenoid valve to close the exhaust of said distributor valve.

11. In a variable capacity compressor, the combination, of an electric motor for operating the compressor, a compressor cylinder, pressure operated control valves for controlling unloading and loading of the cylinder, a distributor valve, a regulator operating said distributor valve for controlling passage of pressure fluid to said control valves, the pressure fluid exhausting from said control valves through said distributor valve, a solenoid operated valve active upon de-energizing of the solenoid to close the exhaust and admit pressure fluid to said control valves through the exhaust of said distributor valve.

12. In a variable capacity compressor, the combination, of an electric motor for operating the compressor, a compressor cylinder, pressure operated control valves for controlling unloading and loading of the cylinder, a distributor valve, a regulator operating said distributor valve for controlling passage of pressure fluid to said control valves, the pressure fluid exhausting from said control valves through said distributor valve, a solenoid operated valve active upon de-energizing of the solenoid to close the exhaust and admit pressure fluid to said control valves through the exhaust of said distributor valve, and means operable at predetermined times for breaking the energizing circuit to said solenoid operated valve and to said motor for stopping the motor and de-energizing the solenoid valve.

13. The combination with a variable capacity compressor including unloading mechanism, a distributor valve for controlling operation of said unloading mechanism, and a regulator for operating said distributor valve of an emergency unloading device, including a solenoid operated valve operable at predetermined emergencies to admit operating fluid to the unloading mechanism of the compressor for completely unloading the compressor irrespective of the regulator controlled loaded or unloaded condition of the compressor.

14. The combination with a variable capacity compressor including unloading mechanism, a distributor valve for controlling operation of said unloading mechanism, and a regulator for operating said distributing valve, of an emergency unloading device, including a solenoid operated valve controlling exhaust therethrough of the pressure fluid utilized for operating the unloading mechanism of the compressor during the energized condition of the solenoid and closing the exhaust and admitting operating pressure fluid to the unloading mechanism upon the de-energizing of the solenoid.

15. The combination with a variable capacity compressor including unloading mechanism, a distributor valve for controlling operation of said unloading mechanism, and a regulator for operating said distributor valve, of an emergency unloading device including a solenoid operated valve operable at predetermined emergencies to admit operating fluid to the unloading mechanism of the compressor for completely unloading the compressor irrespective of the regulator control loaded or unloaded condition of the compressor, a motor for operating the compressor, and means to arrest operation of said motor upon operation of said solenoid operated valve at said predetermined emergencies.

16. The combination with a variable capacity compressor including unloading mechanism, a distributor valve for controlling operation of said unloading mechanism, and a regulator for operating said distributor valve, of an emergency unloading device including a solenoid operated valve controlling exhaust therethrough of the pressure fluid utilized for operating the unloading mechanism during the energized condition of the solenoid and closing the exhaust and admitting operating pressure fluid to the unloading mechanism upon the deenergizing of the solenoid motor for operating the compressor and means to arrest operation of said motor upon deenergizing of the solenoid.

In testimony whereof I affix my signature.

ALEXANDER V. SAHAROFF.